United States Patent
Bastioli et al.

(10) Patent No.: US 10,711,098 B2
(45) Date of Patent: Jul. 14, 2020

(54) PROCESS FOR REMOVAL OF TETRAHYDROFURAN

(71) Applicant: Novamont S.p.A., Novara (IT)

(72) Inventors: Catia Bastioli, Novara (IT); Luigi Capuzzi, Novara (IT); Angelos Rallis, Novara (IT)

(73) Assignee: NOVAMONT S.P.A., Novara (IT)

( * ) Notice: Subject to any disclaimer, the term of this patent is extended or adjusted under 35 U.S.C. 154(b) by 26 days.

(21) Appl. No.: 16/081,067

(22) PCT Filed: Feb. 28, 2017

(86) PCT No.: PCT/EP2017/054623
§ 371 (c)(1),
(2) Date: Aug. 30, 2018

(87) PCT Pub. No.: WO2017/148931
PCT Pub. Date: Sep. 8, 2017

(65) Prior Publication Data
US 2019/0106536 A1    Apr. 11, 2019

(30) Foreign Application Priority Data
Mar. 1, 2016 (EP) .................................. 16157987

(51) Int. Cl.
*C08G 63/90* (2006.01)
*C08G 63/183* (2006.01)

(52) U.S. Cl.
CPC ........... *C08G 63/90* (2013.01); *C08G 63/183* (2013.01)

(58) Field of Classification Search
USPC .................................................. 528/480, 481
See application file for complete search history.

(56) References Cited

FOREIGN PATENT DOCUMENTS

| | | |
|---|---|---|
| JP | S61 296026 A | 12/1986 |
| WO | WO 96/35654 | 11/1996 |

OTHER PUBLICATIONS

Database WPI/Thomson Scientific—Abstract for JP S51 28196 A, Mar. 9, 1976. XP002761022.

*Primary Examiner* — Terressa Boykin
(74) *Attorney, Agent, or Firm* — Polsinelli PC

(57) ABSTRACT

Provided is a process for the removal of tetrahydrofuran from polyesters or copolyesters comprising 1,4-butylene dicarboxylate repeating units and from compositions comprising the polyesters or copolyesters.

20 Claims, No Drawings

PROCESS FOR REMOVAL OF TETRAHYDROFURAN

CROSS REFERENCE TO RELATED APPLICATIONS

This application is a National Phase filing under 35 U.S.C. § 371 of PCT/EP2017/054623 filed on Feb. 28, 2017; and this application claims priority to application Ser. No. 16/157,987.5 filed on Mar. 1, 2016 in Europe. The entire contents of each application are hereby incorporated by reference.

This invention relates to a process for the removal of tetrahydrofuran from polyesters or copolyesters comprising 1,4-butylene dicarboxylate repeating units and from compositions comprising the said polyesters or copolyesters.

Polyesters and copolyesters comprising 1,4-butylene dicarboxylate repeating units, such as for example poly(1,4-butylene terephthalate), poly(1,4-butylene succinate), poly(1,4-butylene sebacate), poly(1,4-butylene terephthalate-co-1,4-butylene adipate), are currently widely used because of their excellent mechanical properties and their workability in all fields in which thermoplastic polymer materials are used, such as those of fibres, moulded articles and blown and film articles.

It is known that during the synthesis of polyesters of this type, which comprises the condensation reaction of 1,4-butanediol with diacids or their derivatives, tetrahydrofuran (THF) can be formed, deriving mainly from the 1,4-butanediol dehydration reaction during synthesis of the polyester:

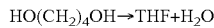

$HO(CH_2)_4OH \rightarrow THF + H_2O$ and degradation of the terminal hydroxybutyl groups formed during the synthesis of the polyester itself ("backbiting" reaction):

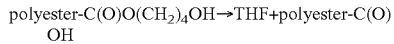

polyester-C(O)O(CH$_2$)$_4$OH → THF+polyester-C(O)OH depending upon the reaction conditions used.

The production of THF during the process of synthesising the said polyesters and copolyesters on the one hand leads to undesired consumption of 1,4-butanediol and on the other hand to the requirement for developing suitable treatments for removing it. In general the THF formed is removed and recovered from the synthesis processes by fractionation together with the volatile components produced during the synthesis of the said polyesters, mainly during the esterification/transesterification stages in the said processes. Although the said treatments result in its removal, polyesters and copolyesters comprising repeating 1,4-butylene dicarboxylate units still contain residual quantities of THF. In addition to this, the hot stages of processing the said polyesters and copolyesters can encourage subsequent degradation reactions, with the further formation of THF.

The presence of THF is a factor which might potentially impede use of the said polyesters and copolyesters, above all in the sector of materials in contact with foodstuffs, which can absorb the THF from the materials with which they come into contact and for which, for example, EU Regulation 10/2011 provides for a maximum THF content in foods of 0.6 mg/kg of foodstuff.

There is therefore a need to have polyesters and copolyesters comprising 1,4-butylene dicarboxylate repeating units having a low THF content and therefore suitable methods for removing the latter.

This invention meets this requirement through a simple and efficient process for removal of tetrahydrofuran from polyesters or copolyesters comprising 1,4-butylene dicarboxylate repeating units and from compositions containing them after the polycondensation or copolymerization phase. Said polyesters, copolyesters comprising 1,4-butylene dicarboxylate repeating units or compositions containing them, due their very low THF content, can be advantageously used to prepare articles, for example thermoformed or moulded, for use in contact with foodstuffs.

In particular this invention relates to a process for the removal of tetrahydrofuran from polyesters and copolyesters comprising 1,4-butylene dicarboxylate repeating units and from compositions comprising it, which comprises the stages of:

1. contacting a gaseous flow with the said polyesters, copolyesters or compositions containing them at a temperature between 60° C. and 150° C., preferably between 70° C. and 145° C., more preferably between 80° C. and 140° C., even more preferably between 90° C. and 130° C., at an absolute pressure between 800 mbar and 5 bar, preferably between 900 mbar and 2 bar, even more preferably between 1 and 1.5 bar;
2. separating the gaseous flow containing tetrahydrofuran from said polyesters, copolyesters or compositions containing them; and
3. recovering the polyesters, copolyesters or compositions containing them with a residual tetrahydrofuran content of less than 10 ppm, preferably less than 6 ppm, more preferably less than 4 ppm, and even more preferably 3 ppm or less.

This invention also relates to polyesters and copolyesters comprising 1,4-butylene dicarboxylate repeating units and compositions containing them that can be obtained by the said process.

Among the advantages of the process according to this invention there is the fact that it can be carried out continuously or on a batch basis depending, for example, on the process requirements, in both cases ensuring simplicity of operation and high efficiency.

The process according to this invention may also be carried out using different items of equipment or a single item of equipment, or in different parts of the same equipment. For simplicity of description, in the remainder of the application, reference will be made to process operations with reference to a single item of equipment, it nevertheless being understood that it also includes the possibility of carrying them out in different items of equipment or in different parts of the same equipment.

In the situation where the process according to this invention is carried out in a continuous manner, its operations may also be performed using two or more items of equipment, which may operate simultaneously or alternately, in series or in parallel, thus making it possible to shut down one of the items of equipment if necessary without interrupting the process. Where not explicitly described otherwise, in this invention, when reference is made to an operation, configurations of the process comprising a single item of equipment and configurations thereof comprising two or more items of equipment placed in series or in parallel will also be understood to be included.

The process according to this invention may be carried out in any equipment suitable for contacting a gaseous flow with said polyesters or copolyesters comprising 1,4-butylene dicarboxylate repeating units or compositions containing the said polyesters and copolyesters and separating the gaseous flow containing tetrahydrofuran from the polyesters, copolyesters or compositions containing them having a residual tetrahydrofuran content of less than 10 ppm, preferably less than 6 ppm, more preferably less than 4 ppm, and even more preferably 3 ppm or less.

Examples of equipment which can be used to carry out the process according to this invention are vertical, horizontal or inclined drying units, of the rotating drum or fluidised bed type, preferably vibrated, belt drying ovens, tanks, fixed bed, semi-fluid or fluid columns, and diffusers. Those skilled in the art will be able to select the most appropriate equipment for the process requirements on the basis for example of the production capacity required, the physical form of the materials which have to be treated, whether they are polyesters, copolyesters or compositions containing them.

Thanks to its simplicity and efficiency, the said process can be applied to polyesters and copolyesters and compositions containing them in the form of granules, powders, flakes, particles, shavings, lumps, fragments, flakes or chips of any shape which can be obtained through a comminuting operation, and in the form of finished manufactured articles, for example moulded pieces, comprising the said polyesters and copolyesters and compositions containing them.

For simplicity of description, in the remainder of the application, if not otherwise specified, reference will be made to the process of removing THF from polyesters containing 1,4-butylene dicarboxylate repeating units, but it will nevertheless be understood that the process according to this invention can also be implemented in respect of copolyesters comprising 1,4-butylene dicarboxylate repeating units and compositions comprising said polyesters and copolyesters comprising 1,4-butylene dicarboxylate repeating units. Where not explicitly described otherwise, in this invention when reference is made to implementation of the process on polyesters comprising 1,4-butylene dicarboxylate repeating units, forms of implementing it on polyesters in any form, for example granules, powders, flakes, particles, shavings, lumps, pieces, fragments, flakes or chips any shape which can be obtained through a comminuting operation, as well as finished manufactured articles, for example moulded pieces, are meant to be included.

In stage 1 of the process, the polyesters comprising 1,4-butylene dicarboxylate repeating units are contacted with a gaseous flow under conditions such as to cause transfer of the tetrahydrofuran to the gaseous flow.

The gaseous flow may be formed of any gas or mixture of gases such as not to compromise the properties of the polyesters comprising 1,4-butylene dicarboxylate repeating units, such as for example air, nitrogen, argon, carbon dioxide, helium and mixtures thereof. In a preferred embodiment of this invention the gaseous flow comprises air, nitrogen, argon or helium, more preferably air, preferably having an absolute moisture content below 100 g of $H_2O$ per kg of dry air, preferably below 20 g of $H_2O$ per kg of dry air, and even more preferably below 5 g of $H_2O$ per kg of dry air, in order to limit any polyester hydrolysis phenomena.

The polyesters comprising 1,4-butylene dicarboxylate repeating units are placed in contact with said gaseous flow at a temperature between 60° C. and 150° C., preferably between 70° C. and 145° C., more preferably between 80° C. and 140° C., even more preferably between 90° C. and 130° C. Excessively high temperatures may cause degradation through accelerated aging, while temperatures below this range may not ensure the effective removal of THF.

In one embodiment, the said temperature conditions are brought about by heating the gaseous flow before it is placed in contact with the polyesters comprising 1,4-butylene dicarboxylate repeating units. In an alternative embodiment, said temperature conditions are brought about by indirectly heating said polyesters through, for example, one or more heat exchangers. A combination of the two embodiments described above is equally suitable.

As regards the pressure imposed during stage 1 of the process according to this invention, this is comprised between 800 mbar and 5 bar, preferably between 900 mbar and 2 bar, even more preferably between 1 and 1.5 bar. Pressures that are too high or pressures below this range do not in fact ensure effective kinetics for the removal of THF.

During stage 1 of the process according to this invention contact takes place between the gaseous flow, into which the tetrahydrofuran is transferred, and the polyesters comprising 1,4-butylene dicarboxylate repeating units. Said contact may be brought about in any of the ways known to those skilled in the art to place a gaseous flow in intimate contact with the surface of a solid. In particular, in the process according to this invention, contact between the gaseous flow and the polyesters comprising 1,4-butylene dicarboxylate repeating units can take place both under natural convection conditions and forced convection conditions. Natural convection is advantageously used when the said polyesters have a high surface area/mass ratio, while in the case of a low surface area/mass ratio forced convection is preferably used, for example blowing the gaseous flow in the form of a flow through a bed (which may be fixed or fluid), or any other kind of layer comprising said polyesters.

During contact with the gaseous flow the polyesters comprising 1,4-butylene dicarboxylate repeating units in any form which they are present may advantageously be placed in movement to optimise contact with the said flow and to prevent the formation of gradients within their volume. The said movement may be achieved through any of the methods known to those skilled in the art, for example by means of continuous or batch remixing of the polyesters.

As known, the more intimate and uniform the said contact the more efficient the transfer of tetrahydrofuran. Depending upon process requirements those skilled in the art will be able to identify the conditions and the relative arrangement between the gaseous flow and the polyesters, for example ensuring that preferential paths for the gaseous flow are not formed.

In a preferred embodiment, the process is carried out in batch mode. Although carrying out the process in continuous mode is to be preferred in terms of productivity, the process is equally efficient and simple to operate even in batch mode. According to the said embodiment, stage 1 of contact between the gaseous flow and the polyesters comprising 1,4-butylene dicarboxylate repeating units takes place in an item of equipment, for example a dryer, comprising a vessel having at least one housing for the said polyesters, at least one inlet point and at least one outlet point for the gaseous flow. The said inlet points for the gaseous flow may also be positioned at different points in the vessel, for example at different heights in the case of vertical equipment, so as to minimise the consumption of the gaseous flow and improve the efficiency of removing tetrahydrofuran. In the case where there are several inlet points for the gaseous flow, this may be also injected at different temperatures and flow rates, in any event ensuring that the desired operating conditions for stage 1 are maintained.

In accordance with the said embodiment the polyesters comprising 1,4-butylene dicarboxylate repeating units are first fed to the vessel and then placed in contact under desired temperature and pressure conditions with the gaseous flow which is then continuously fed to the vessel through at least one inlet point and removed (stage 2) continuously from at least one outlet point so as to reduce the content of tetrahydrofuran in said polyesters to amounts of less than 10 ppm, preferably less than 6 ppm, more preferably less than 4 ppm, even more preferably 3 ppm or less.

In order to encourage intimate contact with the gaseous flow and to prevent the formation of THF concentration gradients within the mass of polyesters comprising 1,4-butylene dicarboxylate repeating units, a portion of the same, preferably from 10 to 30% by weight, may advantageously be removed from a point in the vessel (for example the bottom) and fed back to another point (for example from above), thus creating a countercurrent movement of the polyesters with respect to the gaseous flow.

Preferably the level to which the vessel containing the polyesters comprising 1,4-butylene dicarboxylate repeating units is filled is kept at 0.95 or below, more preferably below 0.90, even more preferably 0.40 or below, even more preferably 0.30 or below, even more preferably 0.25 or below, determined as the ratio between the volume of the vessel occupied by the said polyester and the total volume of the vessel itself.

Once this condition has been achieved the feed of gaseous flow is interrupted and the polyesters are discharged from the vessel (stage 3). Those skilled in the art will be capable of determining the time necessary for achieving this condition by determining the residual THF content in the polyester. THF in the polyester may be determined using head space gas chromatography analysis, such as for example in the method described below in this application.

In another embodiment of the invention the process of removing THF is carried out in continuous mode, typically in an item of equipment, for example a continuous dryer or belt drying stove, provided with at least one inlet point and one outlet point for the polyesters comprising 1,4-butylene dicarboxylate repeating units and at least one inlet point and at least one outlet point for the gaseous flow.

In this embodiment, the polyesters comprising 1,4-butylene dicarboxylate repeating units are continuously fed at a feedrate such as to ensure sufficient residence times in the equipment and progress along the longitudinal direction thereof.

In the case of processes carried out in continuous mode, the level to which the equipment containing the polyesters comprising 1,4-butylene dicarboxylate repeating units is filled is controlled on the basis of the average residence time necessary to obtain the desired reduction in THF content.

The gaseous flow is continuously fed to the equipment through one or more inlet points and comes into contact with the said polyesters, for example transversely to the direction of movement of the latter. Again in this case, as in the batch embodiment, the inlet points for the gaseous flow may also be positioned at different points on the equipment, for example along the line of progress which connects the inlet point and the outlet point for the polyesters, so as to minimise the consumption of gaseous flow and improve the efficiency of tetrahydrofuran removal.

In the case where there are several inlet points for the gaseous flow, it may also be injected at different temperatures and flow rates, in any event ensuring maintenance of the desired operating conditions for stage 1. Those skilled in the art will be able to determine the feed rate and the rate of progress suitable for carrying out the process, for example by measuring the residual tetrahydrofuran content in the polyesters comprising 1,4-butylene dicarboxylate repeating units.

The gaseous flow separated in stage 2 of the process according to this invention contains the tetrahydrofuran removed from the polyesters or copolyesters or compositions containing them.

Said gaseous flow containing tetrahydrofuran can advantageously be used in an open cycle, and then be passed to a system for knock-down, recovery, combustion or purification of the tetrahydrofuran, or in a closed cycle, being then partly or wholly again placed in contact with the polyesters comprising 1,4-butylene dicarboxylate repeating units, through a suitable recycling system. Preferably the gaseous flow containing tetrahydrofuran is used in an open cycle.

In another preferred embodiment, the process of the invention involves removal of THF from the polyesters or copolyesters comprising 1,4-butylene dicarboxylate repeating units and subsequently from the compositions containing them.

According to an even more preferred embodiment, the process of the invention comprises the steps of:
1. contacting a gaseous flow with polyesters or copolyesters comprising 1,4-butylene dicarboxylate repeating units at a temperature between 60° C. and 150° C., preferably between 70° C. and 145° C., more preferably between 80° C. and 140° C., even more preferably between 90° C. and 130° C., at an absolute pressure between 800 mbar and 5 bar, preferably between 900 mbar and 2 bar, even more preferably between 1 and 1.5 bar;
2. separating the gaseous flow containing tetrahydrofuran from said polyesters or copolyesters;
3. recovering the polyesters or copolyesters with a residual tetrahydrofuran content of less than 10 ppm, preferably less than 6 ppm, more preferably less than 4 ppm, and even more preferably 3 ppm or less;
4. preparing a composition comprising said polyesters or copolyesters; and
5. treating the composition according to steps 1-3.

Once the desired tetrahydrofuran content has been achieved, the polyesters comprising 1,4-butylene dicarboxylate repeating units may preferably undergo a stage of cooling before subsequent use, the said cooling stage being carried out at a temperature below that used in stage 1, preferably below 35° C., for a time of preferably between 24 and 72 hours, more preferably less than 48 hours.

The polyesters comprising 1,4-butylene dicarboxylate repeating units obtained by the process according to this invention may be used, for example, in the sector of materials for contact with foodstuffs, without impediments associated with contamination of the latter.

This invention also relates to polyesters or copolyesters comprising 1,4-butylene dicarboxylate repeating units and compositions containing them, which can be obtained by the said process.

This invention further relates to polyesters, copolyesters comprising 1,4-butylene dicarboxylate repeating units and compositions containing them having a tetrahydrofuran content of less than 10 ppm, preferably less than 6 ppm, more preferably less than 4 ppm, and even more preferably 3 ppm or less.

According to another embodiment thereof, the present invention relates to articles for use in contact with foodstuffs, preferably thermoformed or moulded, obtainable from said polyesters, copolyesters and compositions containing them having a residual content of tetrahydrofuran of less than 10 ppm, preferably less than 6 ppm, more preferably less than 4 ppm, and even more preferably 3 ppm or less.

The polyesters and the copolyesters according to this invention comprise 1,4-butylene dicarboxylate repeating units, that is in which 1,4-butandiol has been condensed with a diacid, an ester or a salt thereof. The said diacid may be aliphatic and/or aromatic and is preferably selected from the group comprising aromatic dicarboxylic acids of the phthalic acid type, heterocyclic dicarboxylic aromatic compounds, saturated aliphatic dicarboxylic acids, unsaturated aliphatic dicarboxylic acids, their esters, salts and mixtures.

The aromatic dicarboxylic acids of the phthalic acid type are preferably terephthalic acid or isophthalic acid, more preferably terephthalic acid, their esters, salts and mixtures. The heterocyclic dicarboxylic aromatic compounds are preferably 2,5-furandicarboxylic acid, 2,4-furandicarboxylic acid, 2,3-furandicarboxylic acid, 3,4-furandicarboxylic acid, more preferably 2,5-furandicarboxylic acid, their esters, salts and mixtures.

The saturated aliphatic dicarboxylic acids are preferably selected from $C_2$-$C_{24}$, preferably $C_4$-$C_{13}$, more preferably $C_4$-$C_{11}$, saturated dicarboxylic acids, their $C_1$-$C_{24}$ (preferably $C_1$-$C_4$), alkyl esters, their salts and mixtures. Preferably the saturated aliphatic dicarboxylic acids are selected from: succinic acid, 2-ethyl succinic acid, glutaric acid, 2-methyl glutaric acid, adipic acid, pimelic acid, suberic acid, azelaic acid, sebacic acid, undecandioic acid, dodecandioic acid, brassylic acid and their $C_1$-$C_{24}$ alkyl esters, their salts and mixtures.

The unsaturated aliphatic dicarboxylic acids are preferably selected from itaconic acid, fumaric acid, 4-methylenepimelic acid, 3,4-bis(methylene)nonandioic acid, 5-methylene-nonandioic acid, their $C_1$-$C_{24}$, preferably $C_1$-$C_4$, alkyl esters, their salts and mixtures.

In one embodiment of this invention, the 1,4-butylene dicarboxylate repeating units are derived from the condensation of 1,4-butandiol with mixtures containing two or more diacids, preferably of the type listed above.

In a preferred embodiment, the said 1,4-butylene dicarboxylate units are derived from mixtures of aromatic diacids and aliphatic diacids selected from:
A) mixtures of aromatic diacids and aliphatic diacids comprising with respect to the total diacids content:
  0-40% in moles, preferably 0-20%, of one or more aromatic diacids, their esters or salts,
  60-100% in moles, preferably 80-100%, of one or more aliphatic diacids, their esters or salts;
B) mixtures of aromatic diacids and aliphatic diacids comprising with respect to the total diacids content:
  40-95% in moles, preferably 45-80%, of one or more aromatic diacids, their esters or salts,
  5-60% in moles, preferably 20-55%, of one or more aliphatic diacids, their esters or salts;
C) mixtures of aromatic diacids and aliphatic diacids comprising with respect to the total diacids content:
  95-100% in moles, preferably 97-100%, of one or more aromatic diacids, their esters or salts;
  0.5% in moles, preferably 0-3%, of one or more aliphatic diacids, their esters or salts.

In another preferred embodiment, the said 1,4-butylene dicarboxylate units are derived from mixtures comprising at least two aromatic diacids in turn comprising with respect to the total content of aromatic diacids:
  from 1 to 99% in moles, preferably from 5 to 95% and more preferably from 10 to 80% of terephthalic acid, its esters or its salts;
  from 99 to 1% in moles, preferably from 95 to 5% and more preferably from 90 to 20% of 2,5-furandicarboxylic acid, its esters or its salts.

In another preferred embodiment of this invention, the said 1,4-butylene dicarboxylate units are derived from mixtures comprising at least two saturated aliphatic diacids which in turn comprise at least 50% in moles, preferably more than 60% in moles, more preferably more than 65% in moles with respect to the total content of aliphatic diacids of one or more saturated aliphatic diacids selected from the group comprising succinic acid, adipic acid, azelaic acid, sebacic acid, brassylic acid, their $C_1$-$C_{24}$, preferably $C_1$-$C_4$, esters and their mixtures.

In the case of copolyesters, these preferably comprise more than 5% in moles, more preferably more than 10% in moles, even more preferably more than 25% in moles of 1,4-butylene dicarboxylate repeating units. In addition to the 1,4-butylene dicarboxylate units, the said copolyesters preferably comprise alkylene dicarboxylate units in which the alkylene group derives from the condensation of one or more diols other than 1,4-butandiol preferably selected from the group comprising saturated aliphatic diols and unsaturated aliphatic diols, aromatic diols and their mixtures. More preferably the saturated aliphatic diols are selected from the group comprising 1,2-ethandiol, 1,2-propandiol, 1,3-propandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimethanol, neopentylglycol, 2-methyl-1,3-propandiol, dianhydrosorbitol, dianhydromannitol, dianhydroinitol, cyclohexandiol, cyclohexanmethandiol, dialkylene glycols and polyalkylene glycols having a molecular weight of 100-4000, such as for example polyethylene glycol, polypropylene glycol and their mixtures. The unsaturated aliphatic diols are more preferably selected from the group comprising cis 2-butene-1,4-diol, trans 2-butene-1,4-diol, 2-butyne-1,4-diol, cis 2-pentene-1,5-diol, trans 2-pentene-1,5-diol, 2-pentyne-1,5-diol, cis 2-hexene-1,6-diol, trans 2-hexene-1,6-diol, 2-hexyne-1,6-diol, cis 3-hexene-1,6-diol, trans 3-hexene-1,6-diol, 3-hexyne-1,6-diol and their mixtures.

The aromatic diols are instead more preferably selected from the group comprising 2,5-furandimethanol, 2,4-furandimethanol, 2,3-furandimethanol, 3,4-furandimethanol, more preferably 2,5-furandimethanol and their mixtures.

As far as the diacids of the repeating copolyester units other than the 1,4-butylene dicarboxylate unit are concerned, these are preferably selected from the abovementioned diacids for the 1,4-butylene dicarboxylate unit itself.

In addition to the 1,4-butylene dicarboxylate units and any different alkylene dicarboxylate units the polyesters and copolyesters according to this invention preferably comprise repeating units deriving from at least one hydroxy acid in a quantity of between 0 and 49%, preferably between 0 and 30% in moles with respect to the total moles of the dicarboxylic component. Examples of convenient hydroxy acids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactides. The hydroxy acids may be inserted into the chain as such or may also have been previously caused to react with diacids or diols.

Long molecules with two functional groups including functional groups not in the terminal position may also be present in the polyesters and copolyesters according to this invention in quantities not exceeding 10% in moles with respect to the total moles of the total dicarboxylic components. Examples are dimer acids, ricinoleic acid and acids incorporating epoxy groups, including polyoxyethylenes having a molecular weight of between 200 and 10,000.

Diamines, amino acids and amino alcohols may also be present in percentages up to 30% in moles with respect to the total moles of the total dicarboxylic component.

During preparation of the polyesters and copolyesters according to this invention, one or more molecules having multiple functional groups may also be advantageously added in quantities of between 0.1 and 3% in moles with respect to the total moles of the dicarboxylic component (and any hydroxy acids) in order to obtain branched products. Examples of these molecules are glycerol, pentaerythritol, trimethylolpropane, citric acid, dipentaerythritol, acid triglycerides and polyglycerols.

The molecular weight Mn of the polyesters and copolyesters according to this invention is preferably over 10,000 and preferably over 30,000. As far as the dispersity index of the molecular weights, Mw/Mn is concerned, this is instead preferably between 1.5 and 10, more preferably between 1.6 and 5 and even more preferably between 1.8 and 2.7.

Molecular weights Mn and Mw may be measured by Gel Permeation Chromatography (GPC). The measurement may be made with the chromatography system held at 40° C., using a set of three columns in series (particle diameter 5µ and porosities of 500 A, 10,000 A and 100,000 A respectively), a refractive index detector, chloroform as eluent (flow 1 ml/min) and using polystyrene as the reference standard.

The content of terminal acid groups in the polyesters and copolyesters according to this invention is preferably between 10 and 100, preferably between 20 and 60 meq/kg.

The terminal acid groups' content may be measured in the following way: 1.5-3 g of the polyester or copolyester which has to be analysed are placed in a 100 ml flask together with 60 ml of chloroform. After the polyester has been completely dissolved 25 ml of 2-propanol are added, together with 1 ml of deionised water immediately before the analysis. The solution so obtained is titrated against a previously standardised solution of NaOH in ethanol. An appropriate indicator is used to determine the end point of the titration, such as for example a glass electrode for acid-based titrations in non-aqueous solvents. The terminal acid groups' content is calculated on the basis of the consumption of NaOH solution in ethanol using the following equation:

$$\text{Terminal acid groups' content (meq/kg polymer)} = \frac{\lfloor (V_{eq} - V_b) \cdot T \rfloor \cdot 1000}{P}$$

where: $V_{eq}$=ml of NaOH solution in ethanol at the end point of the titration of the sample;
$V_b$=ml of NaOH solution in ethanol required to reach a pH=9.5 during the blank titration;
T=concentration of the NaOH solution in ethanol expressed in moles/litre;
P=weight of the sample in grams.

Preferably the polyesters and copolyesters according to this invention have an inherent viscosity (measured using an Ubbelohde viscosimeter for solutions in $CHCl_3$ of concentration 0.2 g/dl at 25° C.) of more than 0.3 dl/g, preferably between 0.3 and 2 dl/g, more preferably between 0.4 and 1.1 dl/g.

Preferably the polyesters according to this invention are biodegradable. In the meaning of this invention, by biodegradable polyesters are meant biodegradable polyesters in accordance with standard EN 13432.

The polyesters according to this invention may be synthesised according to any of the processes known in the state of the art. In particular they may advantageously be obtained by means of a polycondensation reaction.

Advantageously the synthesis process may be carried out in the presence of a suitable catalyst. By way of example, suitable catalysts are organometallic compounds of tin (for example stannoic acid derivatives), titanium compounds (for example ortho-butyltitanate), aluminium compounds (for example triisopropyl Al), or compounds containing antimony, zinc, zirconium or mixtures thereof.

Typical examples of polyesters and copolyesters according to this invention are poly(1,4-butylene succinate), poly(1,4-butylene adipate), poly(1,4-butylene azelate), poly(1,4-butylene sebacate), poly(1,4-butylene adipate-co-1,4-butylene succinate), poly(1,4-butylene azelate-co-1,4-butylene succinate), poly(1,4-butylene sebacate-co-1,4-butylene succinate), poly(1,2-ethylene adipate-co-1,4-butylene succinate), poly(1,2-ethylene azelate-co-1,4-butylene succinate), poly(1,2-ethylene sebacate-co-1,4-butylene succinate), poly(1,4-butylene adipate-co-1,2-ethylene succinate), poly(1,4-butylene azelate-co-1,2-ethylene succinate), poly(1,4-butylene sebacate-co-1,2-ethylene succinate), poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,2-ethylene adipate-co-1,4-butylene terephthalate), poly(1,2-ethylene sebacate-co-1,4-butylene terephthalate), poly(1,2-ethylene azelate-co-1,4-butylene terephthalate), poly(1,2-ethylene brassylate-co-1,4-butylene terephthalate), poly(1,2-ethylene succinate-co-1,4-butylene terephthalate), poly(1,4-butylene adipate-co-1,2-ethylene terephthalate), poly(1,4-butylene sebacate-co-1,2-ethylene terephthalate), poly(1,4-butylene azelate-co-1,2-ethylene terephthalate), poly(1,4-butylene brassylate-co-1,2-ethylene terephthalate), poly(1,4-butylene succinate-co-1,2-ethylene terephthalate), poly(1,4-butylene adipate-co-1,4-butylene 2,5-furandicarboxylate), poly(1,4-butylene sebacate-co-1,4-butylene 2,5-furandicarboxylate), poly(1,4-butylene azelate-co-1,4-butylene 2,5-furandicarboxylate), poly(1,4-butylene brassylate-co-1,4-butylene 2,5-furandicarboxylate), poly(1,4-butylene succinate-co-1,4-butylene 2,5-furandicarboxylate), poly(1,2-ethylene adipate-co-1,4-butylene 2,5-furandicarboxylate), poly(1,2-ethylene adipate sebacate-co-1,4-butylene 2,5-furandicarboxylate), poly(1,2-ethylene adipate azelate-co-1,4-butylene 2,5-furandicarboxylate), poly(1,2-ethylene adipate and brassylate-co-1,4-butylene 2,5-furandicarboxylate), poly(1,2-ethylene adipate succinate-co-1,4-butylene 2,5-furandicarboxylate), poly(1,4-butylene adipate-co-1,2-ethylene 2,5-furandicarboxylate), poly(1,4-butylene sebacate-co-1,2-ethylene 2,5-furandicarboxylate), poly(1,4-butylene azelate-co-1,2-ethylene 2,5-furandicarboxylate), poly(1,4-butylene brassylate-co-1,2-ethylene 2,5-furandicarboxylate), poly(1,4-butylene succinate-co-1,2-ethylene 2,5-furan-dicarboxylate), poly(1,4-butylene terephthalate), poly(1,4-butylene 2,5-furandicarboxyate), poly(1,2-ethylene terephthalate-co-1,4-butylene terephthalate), poly(1,3-propylene terephthalate-co-1,4-butylene terephthalate), poly(1,4-butylene terephthalate-co-1,4-butylene 2,5-furandicarboxyate), poly(1,2-ethylene terephthalate-co-1,4-butylene 2,5-furan dicarboxyate), poly(1,3-propylene terephthalate-co-1,4-butylene 2,5-furandicarboxyate), poly(1,2-ethylene terephthalate-co-1,4-butylene 2,5-furan-dicarboxyate) poly(1,4-butylene terephthalate-co-1,2-ethylene 2,5-furandicarboxylate), and their block or random copolymers. In a preferred embodiment, the polyesters and copolyesters according to this invention are preferably selected from poly(1,4-butylene succinate), poly(1,4-butylene adipate-co-1,4-butylene terephthalate), poly(1,4-butylene adipate-co-1,4-butylene 2,5-furandicarboxylate), poly(1,4-butylene terephthalate), poly(1,4-butylene 2,5-furandicarboxylate).

This invention also relates to compositions comprising polyesters or copolyesters incorporating 1,4-butylene dicarboxylate repeating units which can be obtained from the said process for the removal of THF. These compositions may include one or more polymer components and one or more other additives, both organic and inorganic.

As far as the said one or more other polymer components are concerned, these are preferably selected from the group comprising chlorinated vinyl polymers, for example PVC, thermoplastic elastomers, for example nitrile rubbers and SBR rubbers, hydroxy acid polyesters, such as for example polylactic acid (PLA), poly(ethylene terephthalate), poly(ethylene 2,5-furandicarboxylate), polyethylene succinate, polyethylene sebacate, polyamides. Compositions comprising polylactic acid and poly(1,4-butylene adipate-co-1,4-butylene terephthalate) are particularly preferred.

As far as the said one or more other additives are concerned, these may be organic, such as for example starch, cellulose, or inorganic, such as for example calcium carbonate, mica, talc or titanium dioxide.

The invention will now be illustrated through examples which are intended to be illustrative in nature and not restricting the invention.

EXAMPLES

THF Analyses

An aliquot of 4-6 g of the sample to be analysed was ground up in a mill with a 500 μm sieve (mean particle size of approximately 200 μm at the 50th percentile) working in liquid nitrogen.

A suitable quantity of the weighed sample (typically approximately 1 g for samples from which THF had already been removed and 50-100 mg for samples in which THF had not been removed) was placed in a bottle having a head space of 20 ml, the internal standard (5 μl of a 0.2% (w/v) solution 2-methyl THF in 2-octanol) was added and the bottle was sealed with a stopper provided with a perforatable PTFE/silicone rubber membrane.

The bottle was conditioned at 125° C. for 30 minutes, after which 100 μl of the head space was injected into the GC-MS using a gas syringe.

The GC was provided with a ZB-624 30 m×0.32 mm×1.0 μm type column and quantification was performed by calibration against an internal standard operating in SIM using the m/z ratios=71+72+86.

GC setting: 50° C. (5' isotherm), heating ramp of 6° C./min up to 80° C., then of 20° C./min up to 220° C.
Carrier: He 1.0 ml/min
Injected volume=100 μl at 250° C.

Example 1

Removal of THF by Forced Convection from Granules in Movement in an Open Cycle

Removal of THF from an aliphatic-aromatic polybutylene terephthalate-co-butyleneadipate polyester.
Equipment:
1. Piovan model DPM605 dryer (hopper capacity=70 litres);
2. Piovan model S52 pneumatic loader (suction capacity=4 litres);
Gaseous material: air (0.4% relative humidity);
Gaseous flow rate in the hopper=75 m³/h;
Temperature of the gaseous flow delivered to the hopper: 93° C. (set-up T);
Material: 50 kg of granules of an aliphatic-aromatic polyester containing 48% in moles of 1,4-butylene terephthalate units with an MFR (190° C., 2.16 kg)=5.2 g/10 min (measured before drying at 90° C. for 1 hour).

Initial THF in the material (mean value from 3 samples): 300 ppm.

All the material, 50 kg, was placed in the hopper of the equipment and the devolatilisation process was started up at the set-up T. The gaseous flow comprising air was injected into the bottom of the hopper and distributed over the mass of granules. This mass of granules was uniformly penetrated by the flow of hot air flowing upwards through the hopper and exited to discharge and subsequent knock-down from the top of the hopper. New fresh air was continuously heated to the set-up temperature and injected into the hopper. During the devolatilisation process the pneumatic loader drew 3.3 kg of granules from the bottom of the hopper over 110 seconds and returned them to its top. This operation brought about a quasi-continuous movement of the granules within the hopper, in a downward direction, in countercurrent to the gaseous flow.

The process was carried out for an overall time of 48 hours, after which the final THF content of the granules was determined and found to be 0.5 ppm (mean value from 2 samples).

At the end of the THF removal process, the temperature was reduced to 35° C. and the gaseous flow conditions were maintained for 12 hours.

The devolatilised polyester will be indicated as polyester AARR1 below.

Preparation of a composition comprising the polyester AARR1

The polyester AARR1 was used to manufacture a composition ("Composition 1") by feeding 10.1 kg/hour of a polymer premix comprising 36.2% by weight of polyester AARR1, 62.2% of Natureworks INGEO 3251D polylactic acid, 0.95% of talc and 0.65% of titanium dioxide to an Icma San Giorgio MCM-25HT L/D 25 mm D 52 twin-screw extruder via a gravimetric metering unit with the following operating parameters:
RPM 150
Thermal profile 50-150-200×9–155×3° C.
Vacuum degassing: −0.9 bar
4×4 mm-hole L/D 1 system.

The head pressure was 10-20 bar, the torque 40-50 bar, the temperature of the melt at the head of the extruder was 155-160° C.

The extrudate so obtained was then cooled in a water bath (23° C.) and surface water was removed with a current of air. Subsequently the rods were cut into small cylinders using a blade cutter.

Composition 1 had a THF content of 11 ppm and an MFR=19 g/10 min.

Removal of THF from Composition 1 Equipment:
1. Piovan model DPM605 dryer (hopper capacity=70 litres);
2. Piovan model S52 pneumatic loader (suction capacity=4 litres);
Gaseous material: air (0.4% relative humidity);
Gaseous flow rate in the hopper=75 m³/h;
Temperature of the gaseous flow injected into the hopper: 93° C. (set-up T);
Material: 50 kg of the product "Composition 1" in the form of granules Initial THF in the material (mean value from 2 samples): 11 ppm;

All the material, 50 kg, was placed in the hopper of the equipment and the devolatilisation process was started up at the set-up T. The gaseous flow comprising air was injected into the bottom of the hopper and distributed over the mass of granules. This mass of granules was uniformly penetrated by the flow of hot air flowing upwards through the hopper and exited to discharge and subsequent knock-down from the top of the hopper. New fresh air was continuously heated to the set-up temperature and injected into the hopper. During the devolatilisation process the pneumatic loader drew 3.3 kg of granules from the bottom of the hopper over 110 seconds and returned them to its top. This operation brought about a quasi-continuous movement of the granules within the hopper, in a downward direction, in countercurrent to the gaseous flow.

The process was carried out over a time of 12 hours preheating+48 hours at the set-up T, at the end of which the final THF content of the granules was determined and found to be 1.8 ppm (mean value from 2 samples).

At the end of the THF removal process the sample was dried at 55° C. for 24 hours maintaining the gaseous flow conditions for 12 hours.

Example 2

Removal of THF by Forced Convection from Granules in Movement in an Open Cycle

Removal of THF from an aliphatic-aromatic polybutylene terephthalate-co-butyleneadipate polyester.
Equipment:
1. Piovan model DPM605 dryer (hopper capacity=70 litres);
2. Piovan model S52 pneumatic loader (suction capacity=4 litres);
Gaseous material: air (0.4% relative humidity);
Gaseous flow rate in the hopper=75 m³/h;
Temperature of the gaseous flow delivered to the hopper: 93° C. (set-up T);
Material: 50 kg of granules of an aliphatic-aromatic polyester containing 48% in moles of 1,4-butylene terephthalate units with an MFR (190° C., 2.16 kg)=6 g/10 min (measured before drying at 90° C. for 1 hour.
Initial THF in the material (mean value from 3 samples): 9.7 ppm All the material, 50 kg, was placed in the hopper of the equipment and the devolatilisation process was started up at the set-up T. The gaseous flow comprising air was injected into the bottom of the hopper and distributed over the mass of granules. This mass of granules was uniformly penetrated by the flow of hot air flowing upwards through the hopper and exited to discharge and subsequent knock-down from the top of the hopper. New fresh air was continuously heated to the set-up temperature and injected into the hopper. During the devolatilisation process the pneumatic loader drew 3.3 kg of granules from the bottom of the hopper over 110 seconds and returned them to its top. This operation brought about a quasi-continuous movement of the granules within the hopper, in a downward direction, in countercurrent to the gaseous flow.

The process was carried out for an overall time of 48 hours, after which the final THF content of the granules was determined and found to be 0.6 ppm (mean value from 2 samples).

At the end of the THF removal process, the temperature was reduced to 35° C. and the gaseous flow conditions were maintained for 12 hours.

The devolatilised polyester will be indicated as polyester AARR2 below.

Preparation of a composition comprising the polyester AARR2

The polyester AARR2 was used to manufacture a composition ("Composition 2") by feeding 10.1 kg/hour of a polymer premix comprising 36.2% by weight of polyester AARR2, 62.2% of Naturewoks INGEO 3251D polylactic acid, 0.95% of talc and 0.65% of titanium dioxide to an Icma San Giorgio MCM-25HT L/D 25 mm D 52 twin-screw extruder via a gravimetric metering unit with the following operating parameters:
RPM 150
Thermal profile 50-150-200×9–155×3° C.
Vacuum degassing: −0.9 bar
4×4 mm-hole L/D 1 system.

The head pressure was 10-20 bar, the torque 40-50 bar, the temperature of the melt at the head of the extruder was 155-160° C.

The extrudate so obtained was then cooled in a water bath (23° C.) and surface water was removed with a current of air. Subsequently the rods were cut into small cylinders using a blade cutter.

Composition 2 had a THF content of 15 ppm and an MFR=18.5 g/10 min.

Removal of THF from Composition 2 Equipment:
1. Piovan model DPM605 dryer (hopper capacity=70 litres);
2. Piovan model S52 pneumatic loader (suction capacity=4 litres);
Gaseous material: air (0.4% relative humidity);
Gaseous flow rate in the hopper=75 m³/h;
Temperature of the gaseous flow injected into the hopper: 93° C. (set-up T);
Material: 50 kg of the product "Composition 2" in the form of granules (mean dimension of the granules=3.4 mm; bulk density of the granules=0.82 kg/litre);
Initial THF in the material (mean value from 2 samples): 15 ppm;

All the material, 50 kg, was placed in the hopper of the equipment and the devolatilisation process was started up at the set-up T. The gaseous flow comprising air was injected into the bottom of the hopper and distributed over the mass of granules. This mass of granules was uniformly penetrated by the flow of hot air flowing upwards through the hopper and exited to discharge and subsequent knock-down from the top of the hopper. New fresh air was continuously heated to the set-up temperature and injected into the hopper. During the devolatilisation process, the pneumatic loader drew 3.3 kg of granules from the bottom of the hopper over 110 seconds and returned them to its top. This operation brought about a quasi-continuous movement of the granules within the hopper, in a downward direction, in countercurrent to the gaseous flow.

The process was carried out over a time of 12 hours preheating+48 hours at the set-up T, at the end of which the final THF content of the granules was determined and found to be 2.0 ppm (mean value from 2 samples).

At the end of the THF removal process the sample was dried at 55° C. for 24 hours maintaining the gaseous flow conditions for 12 hours.

The invention claimed is:
1. A process for the removal of tetrahydrofuran from a polyester or a copolyester comprising 1,4-butylene dicar- boxylate repeating units or from a composition comprising said polyester or copolyester, comprising the steps of:

(1) providing a polyester or a copolyester comprising 1,4-butylene dicarboxylate repeating units or a composition comprising said polyester or copolyester by means of a polycondensation reaction and, if a copolyester is formed a copolymerization reaction;

(2) contacting a gaseous flow with the polyester or copolyester comprising 1,4-butylene dicarboxylate repeating units or the composition comprising said polyester or copolyester at a temperature in the range between 60° C. and 150° C., at an absolute pressure between 800 mbar and 5 bar;

(3) separating the gaseous flow containing the tetrahydrofuran from the polyester or copolyester or from the composition comprising said polyester or copolyester; and (4) recovering the polyester or copolyester or the composition comprising said polyester or copolyester with a residual tetrahydrofuran content of less than 10 ppm; wherein the process for the removal of the tetrahydrofuran is carried out after the polycondensation reaction and, if a copolyester is formed after the copolymerization reaction.

2. The process according to claim 1, in which at the end of step (3) the tetrahydrofuran content is of less than 6 ppm.

3. The process according to claim 1, in which at the end of step (3) the tetrahydrofuran content is of less than 4 ppm.

4. The process according to claim 1, in which at the end of step (3) the tetrahydrofuran content is of 3 ppm or less.

5. The process according to claim 1, in which the gaseous flow is contacted with the polyester, copolyester or composition thereof at a temperature in the range between 70° C. and 145° C.

6. The process according to claim 1, in which the gaseous flow is contacted with the polyester, copolyester or composition thereof at a temperature in the range between 80° C. and 140° C.

7. The process according to claim 1, in which the gaseous flow is contacted with the polyester, copolyester or composition thereof at a temperature in the range between 90° C. and 130° C.

8. The process according to claim 1, in which the gaseous flow is contacted with the polyester, copolyester or composition thereof at an absolute pressure between 900 mbar and 2 bar.

9. The process according to claim 1, in which the gaseous flow is contacted with the polyester, copolyester or composition thereof at an absolute pressure between 1 bar and 1.5 bar.

10. The process according to claim 1, carried out in one or more vertical, horizontal or inclined dryers of rotating drum or fluidised bed, belt drying oven, vessel, fixed, semi-fluid or fluidised bed column type or a diffuser.

11. The process according to claim 1, in which the said polyester or copolyester comprising 1,4-butylene dicarboxylate repeating units or composition thereof is in the form of granules, powders, shavings, particles, lumps, pieces, fragments, flakes, chips of any shape obtained through a comminuting operation, and finished manufactured articles.

12. The process according to claim 1, in which the said gaseous flow comprises air, nitrogen, argon, carbon dioxide, helium and mixtures thereof.

13. The process according to claim 1, in which said gaseous flow consists of air.

14. The process according to claim 1, in which the said polyester or copolyester comprising 1,4-butylene dicarboxylate repeating units is selected from poly(1,4-butylene succinate), poly(1,4-butylene adipate-co-1,4-butylene terephthalate), poly(1,4-butylene adipate-co-1,4-butylene 2,5-furandicarboxylate), poly(1,4-butylene terephthalate), and poly(1,4-butylene 2,5-furandicarboxylate).

15. A polyester or copolyester comprising 1,4-butylene dicarboxylate repeating units and a composition thereof, having a residual tetrahydrofuran content of less than 10 ppm, which can be obtained by means of the process according to claim 1.

16. The process according to claim 2, in which the gaseous flow is contacted with the polyester, copolyester or composition thereof at a temperature in the range between 70° C. and 145° C.

17. The process according to claim 3, in which the gaseous flow is contacted with the polyester, copolyester or composition thereof at a temperature in the range between 70° C. and 145° C.

18. The process according to claim 4, in which the gaseous flow is contacted with the polyester, copolyester or composition thereof at a temperature in the range between 70° C. and 145° C.

19. The process according to claim 2, in which the gaseous flow is contacted with the polyester, copolyester or composition thereof at a temperature in the range between 80° C. and 140° C.

20. The process according to claim 3, in which the gaseous flow is contacted with the polyester, copolyester or composition thereof at a temperature in the range between 80° C. and 140° C.

* * * * *